United States Patent
Shaga

(10) Patent No.: US 12,203,780 B2
(45) Date of Patent: Jan. 21, 2025

(54) TARGET FOR AN INDUCTIVE ANGULAR-POSITION SENSOR

(71) Applicant: Microchip Technology Incorporated, Chandler, AZ (US)

(72) Inventor: Ganesh Shaga, Telangana (IN)

(73) Assignee: Microchip Technology Incorporated, Chandler, AZ (US)

( * ) Notice: Subject to any disclaimer, the term of this patent is extended or adjusted under 35 U.S.C. 154(b) by 186 days.

(21) Appl. No.: 18/048,627

(22) Filed: Oct. 21, 2022

(65) Prior Publication Data

US 2023/0314180 A1   Oct. 5, 2023

(30) Foreign Application Priority Data

Apr. 1, 2022   (IN) .............................. 202241019974

(51) Int. Cl.
*G01D 5/20*   (2006.01)
(52) U.S. Cl.
CPC .................................... *G01D 5/202* (2013.01)
(58) Field of Classification Search
CPC .... G01D 5/202; G01R 33/00; G01R 33/0035; G01R 33/0023; G01R 33/0017;
(Continued)

(56) References Cited

U.S. PATENT DOCUMENTS

| | | |
|---|---|---|
| 1,639,044 A | 8/1927 | Mansbridge |
| 3,197,763 A | 7/1965 | Fisher |

(Continued)

FOREIGN PATENT DOCUMENTS

| | | |
|---|---|---|
| CN | 106255889 A | 12/2016 |
| CN | 108351224 A | 7/2018 |

(Continued)

OTHER PUBLICATIONS

"A Revolution in Sensing: World's First Inductance-to-Digital Converter", LDC1000 Inductive Sensing Brochure, Texas Instruments, 2013, pp. 1-6, Almaden Press, San Jose, CA.

(Continued)

*Primary Examiner* — Jermele M Hollington
*Assistant Examiner* — Taqi R Nasir
(74) *Attorney, Agent, or Firm* — TraskBritt

(57) ABSTRACT

Various examples include a target for an inductive angular-position sensor. The target may rotate about a center axis and may include a number of fins respectively including a respective outer-circumferential edge to overlap a respective first arc at least partially defining a first circle centered at the center axis. A respective first central angle of the respective first arc substantially equal to 360° divided by twice a count of the fins. The number of fins may respectively include a respective inner-circumferential edge, positioned closer to the center axis than the respective outer-circumferential edge is to the center axis. The respective inner-circumferential edge may overlap a respective second arc at least partially defining a second circle centered at the center axis. A respective second central angle of the respective second arc substantially equal to 360° divided by the count of the fins. Related devices, systems and methods are also disclosed.

20 Claims, 7 Drawing Sheets

(58) Field of Classification Search
CPC ............ G01R 31/3191; G01R 33/0358; G01R 33/0356; G01B 7/004; G01C 17/38; G06F 3/017; G06F 3/0346; G06F 3/012; H01L 39/223
See application file for complete search history.

(56) References Cited

U.S. PATENT DOCUMENTS

| | | |
|---|---|---|
| 3,281,826 A | 10/1966 | Moffitt |
| 4,223,300 A | 9/1980 | Wiklund |
| 4,356,732 A | 11/1982 | Hachtel et al. |
| 4,737,698 A | 4/1988 | McMullin et al. |
| 4,847,548 A | 7/1989 | Lafler |
| 4,853,604 A | 8/1989 | McMullin et al. |
| 5,061,896 A | 10/1991 | Schmidt |
| 5,239,288 A | 8/1993 | Tsals |
| 6,111,402 A | 8/2000 | Fischer |
| 6,236,199 B1 | 5/2001 | Irle et al. |
| 6,239,571 B1 | 5/2001 | Shimahara |
| 6,255,810 B1 | 7/2001 | Irle et al. |
| 6,304,014 B1 | 10/2001 | England et al. |
| 6,304,076 B1 | 10/2001 | Madni et al. |
| 6,384,598 B1 | 5/2002 | Hobein et al. |
| 6,483,295 B2 | 11/2002 | Irle et al. |
| 6,522,128 B1 | 2/2003 | Ely et al. |
| 6,591,217 B1 | 7/2003 | Baur et al. |
| 6,593,730 B2 | 7/2003 | Zapf |
| 6,605,940 B1 | 8/2003 | Tabrizi et al. |
| 7,276,897 B2 | 10/2007 | Lee |
| 7,385,389 B2 | 6/2008 | Tahara et al. |
| 7,719,264 B2 | 5/2010 | Tiemann |
| 7,726,208 B2 | 6/2010 | Hoeller et al. |
| 7,821,256 B2 | 10/2010 | Lee |
| 7,906,960 B2 | 3/2011 | Lee |
| 8,278,911 B2 | 10/2012 | Tiemann et al. |
| 8,339,126 B2 | 12/2012 | Izak et al. |
| 8,345,438 B2 | 1/2013 | Mi et al. |
| 8,451,000 B2 | 5/2013 | Tiemann |
| 8,482,894 B2 | 7/2013 | Yra et al. |
| 8,508,242 B2 | 8/2013 | Shao et al. |
| 8,618,791 B2 | 12/2013 | Grinberg et al. |
| 8,928,310 B2 | 1/2015 | Ocket et al. |
| 8,947,077 B2 | 2/2015 | Lee et al. |
| 8,988,066 B2 | 3/2015 | Shao et al. |
| 9,234,771 B2 | 1/2016 | Sasaki |
| 9,300,022 B2 | 3/2016 | Vaisman |
| 9,322,636 B2 | 4/2016 | Fontanet |
| 9,528,858 B2 | 12/2016 | Bertin |
| 9,677,913 B2 | 6/2017 | Wang et al. |
| 9,929,651 B2 | 3/2018 | Cannankurichi et al. |
| 10,415,952 B2 | 9/2019 | Reddy et al. |
| 10,444,037 B2 | 10/2019 | Bertin |
| 10,760,928 B1 | 9/2020 | Shaga et al. |
| 10,761,549 B2 | 9/2020 | Sasmal et al. |
| 10,837,847 B2 | 11/2020 | Smith, Jr. |
| 10,884,037 B2 | 1/2021 | Chellamuthu et al. |
| 10,921,155 B2 | 2/2021 | Shaga et al. |
| 11,313,702 B2 | 4/2022 | Le Goff et al. |
| 11,525,701 B2 | 12/2022 | Lugani et al. |
| 11,525,716 B2 | 12/2022 | El-Shennawy et al. |
| 11,656,101 B2 | 5/2023 | Shaga |
| 2001/0001430 A1 | 5/2001 | Ely et al. |
| 2002/0000129 A1 | 1/2002 | Madni et al. |
| 2002/0097042 A1 | 7/2002 | Kawate et al. |
| 2002/0196015 A1 | 12/2002 | Zapf |
| 2003/0062889 A1 | 4/2003 | Ely et al. |
| 2003/0067941 A1 | 4/2003 | Fall |
| 2003/0206007 A1 | 11/2003 | Gass et al. |
| 2004/0065533 A1 | 4/2004 | Schwesig et al. |
| 2004/0080313 A1 | 4/2004 | Brosh |
| 2004/0081313 A1 | 4/2004 | McKnight et al. |
| 2004/0182602 A1 | 9/2004 | Satoh et al. |
| 2006/0038635 A1 | 2/2006 | Richiuso et al. |
| 2006/0119351 A1 | 6/2006 | James et al. |
| 2006/0125472 A1 | 6/2006 | Howard et al. |
| 2007/0001666 A1 | 1/2007 | Lee |
| 2008/0054887 A1 | 3/2008 | Lee |
| 2008/0164869 A1 | 7/2008 | Bach et al. |
| 2008/0174302 A1 | 7/2008 | Lee et al. |
| 2008/0176530 A1 | 7/2008 | Kuhn et al. |
| 2008/0238416 A1 | 10/2008 | Shiraga et al. |
| 2009/0079422 A1 | 3/2009 | Lee |
| 2010/0271012 A1 | 10/2010 | Patterson et al. |
| 2011/0101968 A1 | 5/2011 | Brands et al. |
| 2012/0081106 A1 | 4/2012 | Grinberg et al. |
| 2012/0175198 A1 | 7/2012 | Thibault et al. |
| 2012/0242304 A1 | 9/2012 | Yra et al. |
| 2012/0242352 A1 | 9/2012 | Gong et al. |
| 2012/0244802 A1 | 9/2012 | Feng et al. |
| 2013/0021023 A1 | 1/2013 | Niwa et al. |
| 2013/0257417 A1 | 10/2013 | Ely |
| 2013/0289826 A1 | 10/2013 | Yoshitake et al. |
| 2015/0233695 A1 | 8/2015 | Gomes et al. |
| 2015/0323348 A1 | 11/2015 | Liu et al. |
| 2015/0323349 A1 | 11/2015 | Has et al. |
| 2016/0099301 A1 | 4/2016 | Yen et al. |
| 2016/0214648 A1 | 7/2016 | Schoepe et al. |
| 2017/0141685 A1 | 5/2017 | Cannankurichi et al. |
| 2017/0158231 A1 | 6/2017 | Farrelly |
| 2017/0166251 A1 | 6/2017 | Shao et al. |
| 2018/0040413 A1 | 2/2018 | Yen et al. |
| 2018/0120083 A1 | 5/2018 | Reddy et al. |
| 2018/0196453 A1 | 7/2018 | Sasmal et al. |
| 2018/0224301 A1 | 8/2018 | Herrmann et al. |
| 2018/0274591 A1 | 9/2018 | Maniouloux et al. |
| 2018/0274948 A1 | 9/2018 | Maniouloux et al. |
| 2019/0009903 A1 | 1/2019 | Chan et al. |
| 2019/0017845 A1 | 1/2019 | Utermoehlen et al. |
| 2019/0025088 A1 | 1/2019 | Utermoehlen et al. |
| 2019/0063956 A1 | 2/2019 | Bertin |
| 2019/0094047 A1* | 3/2019 | Utermoehlen ........ G01D 5/2073 |
| 2019/0186891 A1 | 6/2019 | Utermoehlen et al. |
| 2019/0195963 A1 | 6/2019 | Qama |
| 2019/0226828 A1 | 7/2019 | Lugani et al. |
| 2019/0242725 A1 | 8/2019 | Shaga et al. |
| 2019/0326501 A1 | 10/2019 | Gilbert et al. |
| 2019/0331541 A1 | 10/2019 | Janisch et al. |
| 2019/0360839 A1 | 11/2019 | Shao |
| 2020/0088549 A1* | 3/2020 | Shao .................... G01D 5/202 |
| 2020/0200569 A1 | 6/2020 | Utermoehlen et al. |
| 2020/0271480 A1 | 8/2020 | Shaga et al. |
| 2021/0063206 A1 | 3/2021 | Ausserlechner |
| 2021/0080243 A1 | 3/2021 | Ocket et al. |
| 2021/0098187 A1 | 4/2021 | Kumar et al. |
| 2021/0226877 A1 | 7/2021 | Tamasi et al. |
| 2021/0255657 A1 | 8/2021 | Miller et al. |
| 2021/0372823 A1 | 12/2021 | Witts et al. |
| 2022/0011138 A1 | 1/2022 | Shaga et al. |
| 2022/0034684 A1 | 2/2022 | Le Goff et al. |
| 2022/0155050 A1 | 5/2022 | Gillet et al. |
| 2022/0307868 A1 | 9/2022 | Shaga et al. |
| 2023/0045209 A1 | 2/2023 | Shaga |
| 2023/0175869 A1 | 6/2023 | Goldman |

FOREIGN PATENT DOCUMENTS

| | | | |
|---|---|---|---|
| CN | 112272755 A | | 1/2021 |
| CN | 112484621 A | | 3/2021 |
| DE | 4021637 A1 | | 1/1992 |
| DE | 10120822 A1 | | 4/2002 |
| DE | 102015220615 A1 | | 4/2017 |
| DE | 102019207070 A1 | | 11/2020 |
| EP | 0467514 A2 | | 1/1992 |
| EP | 0845659 A2 | | 6/1998 |
| EP | 1078226 B1 | | 10/2003 |
| EP | 1914520 A2 | | 4/2008 |
| EP | 2145158 A2 | | 1/2010 |
| EP | 2044389 B1 | | 4/2010 |
| EP | 3245485 A1 | | 11/2017 |
| EP | 3865825 A1 * | 8/2021 | .......... G01D 5/2053 |
| FR | 2304900 A1 | | 10/1976 |
| GB | 1502697 A | | 3/1978 |
| GB | 2394293 A | | 4/2004 |
| JP | 3839449 B2 | | 11/2006 |

(56) References Cited

FOREIGN PATENT DOCUMENTS

| JP | 2021-025851 A | 2/2021 |
|---|---|---|
| WO | 2008/125853 A1 | 10/2008 |
| WO | 2008/139216 A2 | 11/2008 |
| WO | 2016/079465 A1 | 5/2016 |
| WO | 2017/100515 A1 | 6/2017 |
| WO | 2018/108783 A2 | 6/2018 |
| WO | 2019/152092 A1 | 8/2019 |
| WO | 2021/239175 A1 | 12/2021 |

OTHER PUBLICATIONS

"Inductive Sensor Coil Design Using LX3301A", AN-S1412 Application Note, Microsemi Corporate Headquarters, One Enterprise, Aliso Viejo, CA 92656 USA, Nov. 2017.
Application of Indian Application Serial No. 202021054245 on file with the Indian Patent Office (not yet published).
U.S. Appl. No. 17/075,157 (not yet published).
Disclosure of U.S. Appl. No. 62/990,403 (not published).
Microchip Technology Inc., "Inductive Sensor Interface IC with Embedded MCU", Summary Data Sheet LX3302A, DS20006496A (Feb. 2020) 48 pages.
Microchip Technology Inc., "Robust, Low-Cost and Noise-Immune Motion-Sensing Inductive Sensors", Automotive brochure, DS00002864A, www.microchip.com/automotive (Dec. 2018) 2 pages.
Song et al.,"Simulations of Nonuniform Behaviors of Multiple No-Insulation (RE)Ba2Cu3O7-x HTS Pancake Coils During Charging and Discharging", IEEE Transactions on Applied Superconductivity, vol. 26, No. 4, (Jun. 2016) 5 pages.
International Search Report and Written Opinion of the International Searching Authority of International Application No. PCT/US2021/039578, mailed Oct. 14, 2021, 10 pages.
International Search Report of International Application No. PCT/US2023/077323, mailed Jan. 23, 2024, 6 pages.
Written Opinion of the International Searching Authority of International Application No. PCT/US2019/042895, dated Oct. 21, 2019, 8 pages.
Written Opinion of the International Searching Authority of International Application No. PCT/US2023/077323, mailed Jan. 23, 2024, 9 pages.
First Office Action and Search Report of Chinese Patent Application No. 202180096199.0, issued May 8, 2024, 32 pages with English translation.
Dauth et al., An Effective Method to Model and Simulate the Behavior of Inductive Angle Encoders, Sensors 22, No. 20: 7804, Oct. 14, 2022, 26 pages.
International Search Report and Written Opinion of the International Searching Authority for related application PCT/US2015/027900 mailed on Jun. 23, 2015, 10 pages.
International Search Report and Written Opinion of the International Searching Authority of International Application No. PCT/US2019/044245, dated Nov. 15, 2019, 10 pages.
International Search Report and Written Opinion of the International Searching Authority of International Application No. PCT/US2021/012006, dated Apr. 7, 2021, 12 pages.
International Search Report for International Application No. PCT/US2022/078524, mailed Apr. 11, 2023, 7 pages.
International Search Report for International Application No. PCT/US2023/065238, mailed Jul. 3, 2023, 6 pages.
International Written Opinion for International Application No. PCT/US2022/078524, mailed Apr. 11, 2023, 14 pages.
International Written Opinion for International Application No. PCT/US2023/065238, mailed Jul. 3, 2023, 9 pages.
Lugani et al., High speed inductive position sensor for E-machines, Melexis Technologies SA, 2021, 7 pages.
Written Opinion of the International Searching Authority of International Application No. PCT/US2018/063681, dated Mar. 8, 2019, 7 pages.
Written Opinion of the International Searching Authority of International Application No. PCT/US2021/12018, dated Mar. 3, 2021, 5 pages.
Written Opinion of the International Search Authority of International Application No. PCT/US2019/042895, dated Oct. 21, 2019, 8 pages.
Second Office Action and Search Report of Chinese Patent Application No. 202180096199.0, issued Oct. 29, 2024, 12 pages with English translation.

\* cited by examiner

TARGET FOR AN INDUCTIVE ANGULAR-POSITION SENSOR

CROSS-REFERENCE TO RELATED APPLICATIONS

This application claims the benefit of the priority date of Indian Provisional Patent Application No. 202241019974, filed Apr. 1, 2022, and titled "INDUCTIVE ANGULAR-POSITION SENSOR, AND RELATED DEVICES, SYSTEMS, AND METHODS," the disclosure of which is incorporated herein in its entirety by this reference.

FIELD

This invention relates generally to inductive angular-position sensing. More specifically, some examples relate to movable targets for non-contacting planar inductive sensors for measuring the position of the movable targets, without limitation. Additionally, devices, systems, and methods are disclosed.

BACKGROUND

If a coil of wire is placed in a changing magnetic field, a voltage will be induced at ends of the coil of wire. In a predictably changing magnetic field, the induced voltage will be predictable (based on factors including the area of the coil affected by the magnetic field and the degree of change of the magnetic field). It is possible to disturb a predictably changing magnetic field and measure a resulting change in the voltage induced in the coil of wire. Further, it is possible to create a sensor that measures movement of a disturber, e.g., a target, of a predictably changing magnetic field based on a change in a voltage induced in one or more coils of wire.

BRIEF DESCRIPTION THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

DETAILED DESCRIPTION

Figure 1A:
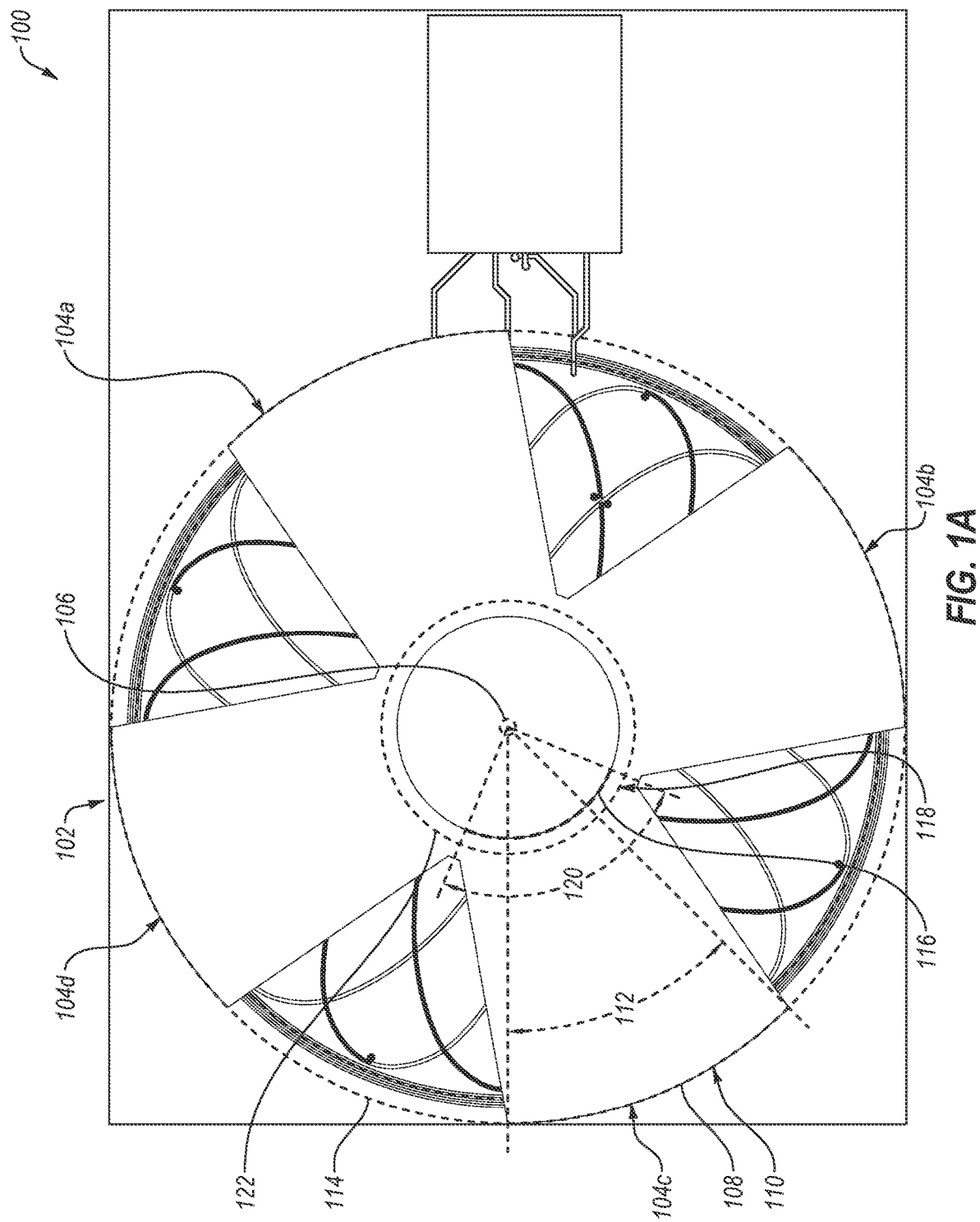
FIG. 1A is a functional block diagram illustrating an apparatus according to one or more examples.

In the following detailed description, reference is made to the accompanying drawings, which form a part hereof, and in which are shown, by way of illustration, specific examples in which the present disclosure may be practiced. These examples are described in sufficient detail to enable a person of ordinary skill in the art to practice the present disclosure. However, other examples may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example of this disclosure to the specified components, steps, features, functions, or the like.

It will be readily understood that the components of the examples as generally described herein and illustrated in the drawing could be arranged and designed in a wide variety of different configurations. Thus, the following description of various examples is not intended to limit the scope of the present disclosure, but is merely representative of various examples. While the various aspects of the examples may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be depicted by block diagram form in order not to obscure the present disclosure in unnecessary detail. Conversely, specific implementations shown and described are only examples and should not be construed as the only way to implement the present disclosure unless specified otherwise herein. Additionally, block definitions and partitioning of logic between various blocks is an example of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, and symbols that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal. A person having ordinary skill in the art would appreciate that this disclosure encompasses communication of quantum information and qubits used to represent quantum information.

The various illustrative logical blocks, modules, and circuits described in connection with the examples disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer executes computing instructions (e.g., software code, without limitation) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

An inductive angular-position sensor may include, one or more oscillator coils, a first sense coil, a second sense coil, a target, and an integrated circuit including an oscillator to drive the oscillator coil and electronic circuits to receive and demodulate respective outputs of the first and second sense coils. Such an inductive angular-position sensor may determine an angular position of the target relative to the one or more oscillator coils or the sense coils.

The oscillator may generate an excitation signal. The one or more oscillator coils may be excited by the excitation signal. The oscillating signal on the one or more oscillator coils may generate a changing (oscillating) magnetic field near and especially within a space encircled by the oscillator coil, although not limited thereto.

The changing magnetic field generated by the one or more oscillator coils may induce a first oscillating voltage at ends of the first sense coil and a second oscillating voltage at ends of the second sense coil. The first oscillating voltage at the ends of the first sense coil may oscillate in response to the oscillation of the excitation signal and may be a first sense signal. The second oscillating voltage at the ends of the second sense signal may oscillate in response to the oscillation of the excitation signal and may be a second sense signal.

The target may be positioned relative to the one or more oscillator coils, the first sense coil, and the second sense coil. For example, the target, or a portion of the target, may be positioned above a portion of the one or more oscillator coils, the first sense coil, and the second sense coil, without limitation. The target may disrupt some of the changing magnetic field that passes through one or more loops of the first sense coil and the second sense coil.

The location of the target, or the portion of the target, above one or more of the first sense coil and the second sense coil may affect the first sense signal and the second sense signal induced in the first sense coil and the second sense coil respectively. For example, the target may disrupt magnetic coupling between the one or more oscillator coils and the first and second sense coils. Such disruption may affect a magnitude of the first and second sense signals induced in the first and second sense coils, respectively. For example, in response to the target, or a portion of the target, being over a loop in the first sense coil, the amplitude of the first sense signal may be less than the amplitude of the first sense signal when the target is not over the loop in the first sense coil.

Further, the target may rotate (e.g., around an axis, without limitation) such that a portion of the target may pass over, or under, one or more loops of one or more of the first sense coil and the second sense coil. As the target rotates, the first sense signal of the first sense coil and the second sense signal of the second sense coil may be amplitude modulated in response to the rotation of the target and in response to the portion of the target passing over the loops.

In one or more examples, the integrated circuit may generate an output signal responsive to the first sense signal and the second sense signal. The output signal may be a fraction of a rail voltage based on the first sense signal and the second sense signal. The output signal may be related to an angular position of the target, or the position of the portion of the target, and successive samples of the output signal may be related to a direction of movement of the target. Thus, the inductive angular-position sensor may generate an output signal indicative of an angular-position of a target.

In one or more examples, the integrated circuit may generate a first output signal based on the first sense signal and a second output signal based on the second sense signal. The first output signal may be the first sense signal demodulated; the second output signal may be the second sense signal demodulated. Together, the two output signals may be related to an angular position of the target and subsequent samples of the first and second output signals may be indicative of rotation of the target.

In one or more examples, the integrated circuit may generate a single output signal based on the first sense signal and the second sense signal. As a non-limiting example, the integrated circuit may generate the single output signal based on a relationship (e.g., an arctangent, without limitation) of the first sense signal and the second sense signal.

A shape of the target and shapes of the sense coils may determine how coupling between the oscillator coil and the sense coils changes as the target rotates. A target that covers an area encircled by lobes of the sense coils that change following a sinusoidal pattern may allow the sensor to produce more accurate results. For example, if an area encircled by a sense coil, and covered by a target, is mapped as a function of target rotation, an area that follows a sinusoidal curve as a function of rotation angle, may allow a sensor incorporating the sense coil and the target to produce accurate position results, e.g., more accurate than other sense coils and other targets.

Various examples may include targets or sense coils having shapes that may cause sense signals from the respective sense coils to exhibit desirable waveform shapes. The shapes of targets or path portions of the sense coils may be related to how the sense signals generated therein are amplitude modulated as the target disrupts magnetic field between the oscillator coil and the sense coils. As a non-limiting example, as the target rotates above sense coils and disrupts the magnetic field between the oscillator coil and the sense coils, the shape of the target or the sense coils may determine the shape of an amplitude-modulation envelope exhibited by the sense signals.

As a non-limiting example, an amplitude-modulation envelope of sense signals of sense coils of various examples may be close to a sinusoidal shape. A sinusoidally-shaped amplitude-modulation envelope may be well-suited for translation into an angular position e.g., through a trigonometric function e.g., arctangent, without limitation.

Some examples include sense coils and targets that cause the integrated circuit to generate a constant-slope output signal in response to rotation of the target, relative to the first sense coil and the second sense coil. The constant-slope output signal may be an output signal with a known correlation (e.g., a linear relationship, without limitation) between an amplitude of the output signal and the angular position of the target.

One or more examples of the present disclosure may include elements of inductive angular-position sensors (including, e.g., sense coils and targets, without limitation) which may allow such inductive angular-position sensors to provide a more accurate correlation between output signals and the angular-position of the target relative to the sense coils. In other words, one or more examples of the present disclosure may include elements for inductive angular-position sensors that may cause the inductive angular-position sensors to be more accurate than other inductive angular-position sensors. Additionally or alternatively, one or more examples may include inductive angular-position sensors that are more accurate than other inductive angular-position sensors.

Various example targets or sense coils may increase sensitivity of sensors by increasing a degree to which magnetic coupling between oscillator coils and sense coils is disrupted by targets.

Additionally or alternatively, various example targets or sense coils may allow sensors to include a larger air gap than other sensors. For example, various examples may allow sensors to have greater manufacturing tolerances or design tolerances. As a non-limiting example, as a result of the increased sensitivity of sensors (e.g., based on increased disruption of magnetic coupling by targets, without limitation) a target may be positioned farther away from sense coils or the oscillator coil than other targets of other inductive angular-position sensors and may yet produce sense signals exhibiting similar magnitudes of amplitude modulation as the other inductive angular-position sensors.

Additionally or alternatively, various example targets and sense coils may reduce the cost of targets by reducing the size of targets (e.g., while still producing sense signals having similar amplitudes to other sensors including other targets or amplitudes that are within an operational threshold of the sensor, without limitation). Further reducing the size of targets may reduce the weight of the targets. Reducing the weight of targets may save energy in systems that use the sensors e.g., because a rotor coupled to a target will have less rotational inertia by reason of the target being lighter.

In the present disclosure, references to things (including sense coils, oscillator coils, and paths, without limitation) being "at," "in," "on," "arranged at," "arranged in," "arranged on" and like terms a support structure may refer to the things being arranged substantially within or on a surface of the support structure. As a non-limiting example, sense coils may include conductive lines in one or more planes (e.g., layers) of a printed circuit board (PCB). A sense coil arranged at a support structure may include conductive lines in multiple layers within the support structure.

In the present disclosure, references to targets being "above," or "beneath," sense coils or oscillator coils may indicate that the target may be positioned relative to the sense coils or oscillator coils in an example orientation. The relative position of the target may be such that the target disrupts magnetic field between the oscillator coils and the sense coils. The orientation of may be changeable e.g., as an inductive angular-position sensor including the target is moved. A target positioned "above" or "beneath" sense coils or oscillator coils may disrupt magnetic coupling between the sense coils and the oscillator coils.

Sensors can be used for rotor position sensing of motors where sensors are mounted inside the assembly, among other things. Various examples may be applicable in targeting applications for through-shaft sensor with low-form-factor PCBs. However, examples disclosed herein are not limited to rotor sensing.

Example sensors described and illustrated herein include four-pole pair sensors for complete 360° rotation of a target which may generate four repetitive sensor output signals. In other words, a 360° rotation of the target may result in four cycles of a position output signal or four cycles of sense signals. However, this disclosure is not limited to sensors (or targets) that have specific numbers of "lobes" or "poles." In other examples other numbers of poles or lobes may be used. For example, a three-pole sensor, a five-pole sensor, or a six-pole sensor, without limitation, may be used.

FIG. 1A is a functional block diagram illustrating an apparatus 100 according to one or more examples. Apparatus 100 may be, or may include, an inductive angular-position sensor and may also be characterized herein as an "inductive angular-position sensor 100." Apparatus 100 may include target 102. Target 102 may, in a contemplated operation, disrupt magnetic coupling between sense coils and an oscillator coil of the inductive angular-position sensor. An angular position of target 102 may change. The degree to which target 102 disrupts magnetic coupling between sense coils and oscillator coil of inductive angular-position sensor may vary at least partially in response to changes in the angular-position of target 102. Target 102 may be formed of a conductive material such as metal, without limitation.

Target 102 may rotate around a center axis 106. Target 102 may include fins 104 (fin 104a, fin 104b, fin 104c, and fin 104d may be referred to collectively as "fins 104" or individually as a respective "fin 104").

Respective ones of fins 104 may include a respective outer-circumferential edge 108 that may overlap a respective first arc 110. The respective first arc 110 may at least partially define a first circle 114 centered at center axis 106. A respective first central angle 112 of the respective first arc 110 may be substantially equal to 360° divided by twice a count of the number of fins 104. The respective first central angle 112 may have a respective first apex at the center axis 106. As such, the collective outer-circumferential edges 108 of fins 104 may overlap half of first circle 114.

Respective ones of fins 104 may include a respective inner-circumferential edge 116. The respective inner-circumferential edge 116 may be positioned closer to center axis 106 than a respective outer-circumferential edge 108 is to center axis 106. The respective inner-circumferential edge 116 may overlap a respective second arc 118. The respective second arc 118 may at least partially define a second circle 122 centered at center axis 106. A respective second central angle 120 of the respective second arc 118 may be substantially equal to 360° divided by the count of the number of fins 104. The respective second central angle 120 may have a respective second apex at center axis 106. As such, the collective inner-circumferential edges 116 of fins 104 may overlap all of second circle 122.

Figure 1B:
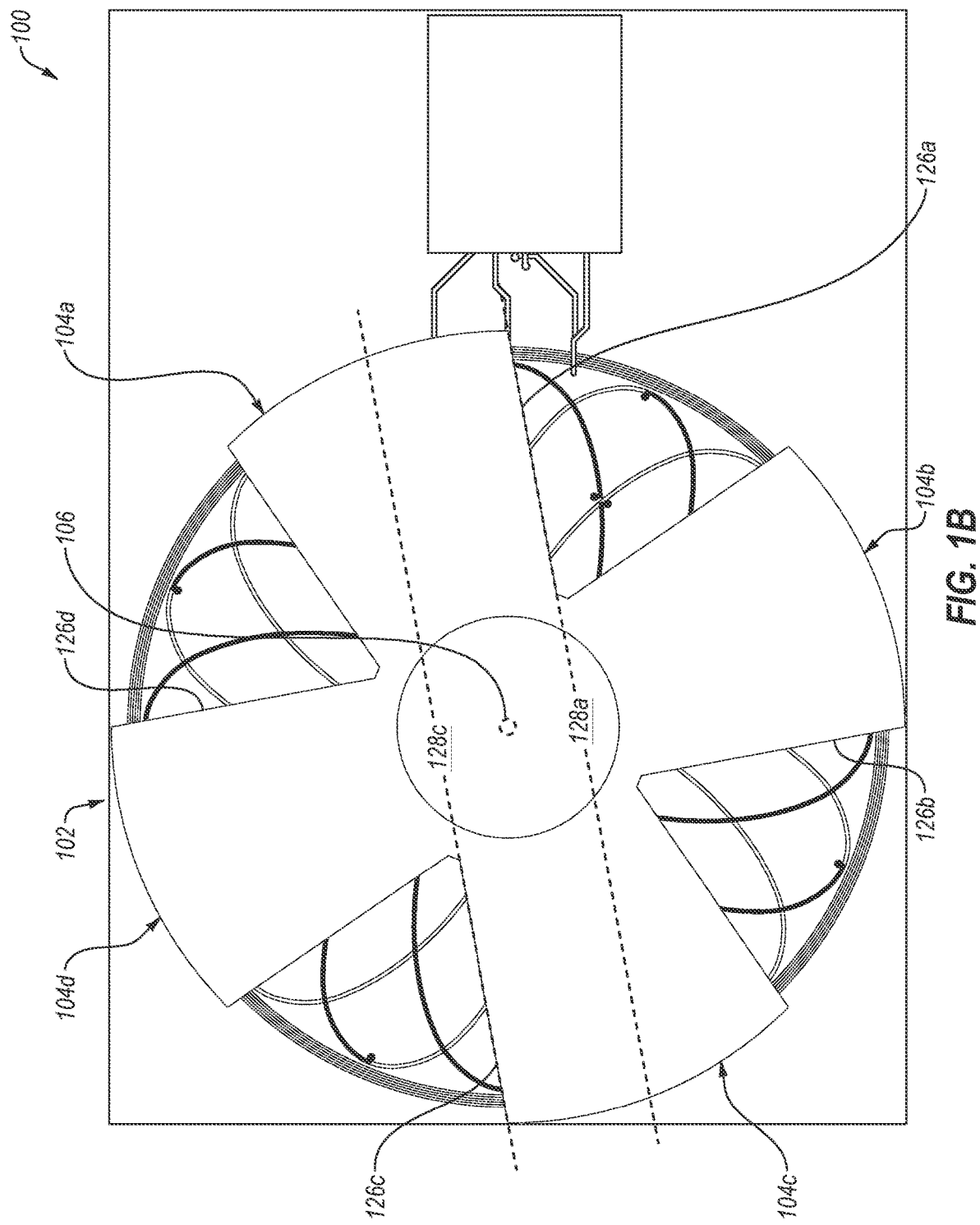
FIG. 1B is a functional block diagram illustrating the apparatus of FIG. 1A according to one or more examples.
Figure 1C:
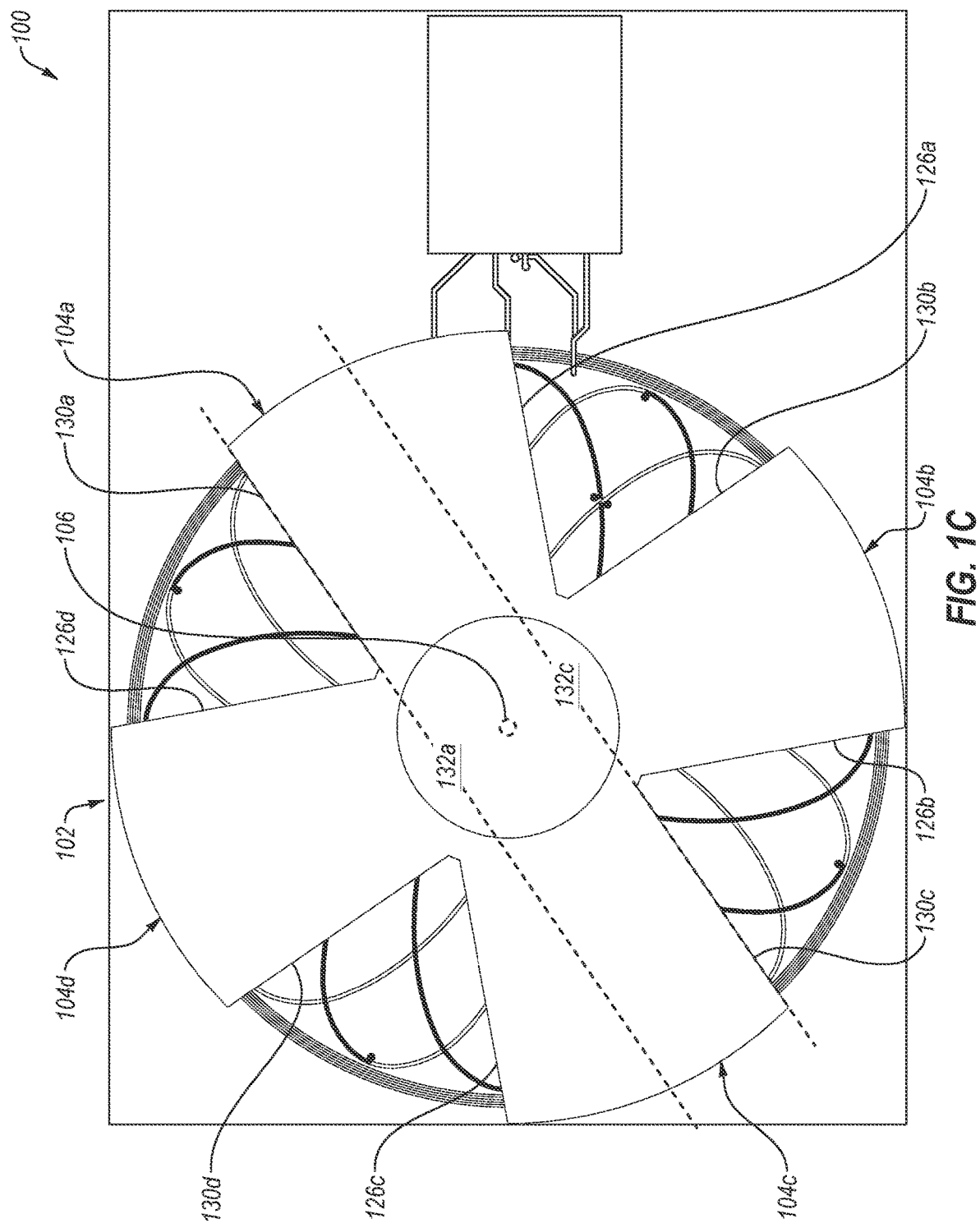
FIG. 1C is a functional block diagram illustrating the apparatus of FIG. 1A according to one or more examples.

Target 102, as illustrated in FIG. 1A, FIG. 1B, and FIG. 1C includes four fins 104 as an example. According to the example of target 102, the first central angles 112 of the respective first arcs 110 may be substantially 45° and the second central angles 120 of the respective second arcs 118 may be substantially 90°. According to another non-limiting example, a target may include three fins. According to such an example, the first central angles 112 of the respective first arcs 110 may be substantially 60° and the second central angles 120 of the respective second arcs 118 may be substantially 120°. According to another non-limiting example, a target may include six fins. According to such an example, the first central angles 112 of the respective first arcs 110 may be substantially 30° and the second central angles 120 of the respective second arcs 118 may be substantially 60°. According to another non-limiting example, a target may include eight fins. According to such an example, the first central angles 112 of the respective first arcs 110 may be substantially 22.5° and the second central angles 120 of the respective second arcs 118 may be substantially 45°.

Disclosed target 102 may increase disruption of magnetic coupling compared with conventional targets. A greater degree of disruption of magnetic coupling by target 102, may allow a sensor to sense similar magnitudes changes in magnetic fields resulting from movement of target 102, even when target 102 is positioned farther away from the sense coils and/or oscillator coil than conventional targets are positioned from conventional sense coils and/or oscillator coils. Thus, target 102 may allow sensors including target 102 to include a larger air gap (e.g., the distance between target 102 and sense coils and/or oscillator coils) than other sensors including other targets. For example, various examples may allow sensors to have greater manufacturing tolerances or design tolerances with regard to an air gap of the sensors. As a non-limiting example, as a result of the increased sensitivity of sensors (e.g., based on increased disruption of magnetic coupling by target 102, without limitation) target 102 may be positioned farther away from sense coils or the oscillator coil than other targets of other inductive angular-position sensors and may yet produce sense signals exhibiting similar magnitudes of amplitude modulation as the other inductive angular-position sensors.

FIG. 1B is a functional block diagram illustrating apparatus 100 according to one or more examples.

Apparatus 100 may include target 102 for an inductive angular-position sensor. Target 102 may rotate around center axis 106. Target 102 may include a number of fins 104 evenly radially spaced around center axis 106. Respective ones of the number of fins 104 may include a respective clockwise-leading edge 126 (e.g., fin 104a may include clockwise-leading edge 126a and fin 104c may include clockwise-leading edge 126c). Clockwise-leading edge 126a, clockwise-leading edge 126b, clockwise-leading edge 126c, and clockwise-leading edge 126d may be collectively referred to as "clockwise-leading edges 126" or individually as a respective "clockwise-leading edge 126."

The respective clockwise-leading edge 126 of respective ones of the number of fins 104 may define a respective line 128 (e.g., clockwise-leading edge 126a may define line 128a and clockwise-leading edge 126c may define line 128c). Line 128a and line 128c may be referred to collectively as "lines 128" or individually as a respective "line 128." Respective lines 128 may be parallel to, and not in line with, a respective further line defined by a respective clockwise-leading edge 126 of a respective fin 104 opposite, relative to center axis 106, the fin 104. As a non-limiting example, clockwise-leading edge 126a of fin 104a may define line 128a. Line 128a may be parallel to, and not in line with, line 128c, which line 128c may be defined by clockwise-leading edge 126c of fin 104c, which fin 104c may be opposite fin 104a.

FIG. 1C is a functional block diagram illustrating apparatus 100 according to one or more examples.

Respective ones of the number of fins 104 may include a respective clockwise-trailing edge 130 (e.g., fin 104a may include clockwise-trailing edge 130a and fin 104c may include clockwise-trailing edge 130c). Clockwise-trailing edge 130a, clockwise-trailing edge 130b, clockwise-trailing edge 130c, and clockwise-trailing edge 130d may be referred to collectively as "clockwise-trailing edges 130" or individually as a respective "clockwise-trailing edge 130."

The respective clockwise-trailing edge 130 of respective ones of the number of fins 104 may define a respective other line 132 (as a non-limiting example, clockwise-trailing edge 130a may define line 132a and clockwise-trailing edge 130c may define line 132c). Line 132a and line 132c may be referred to collectively as "lines 132" or individually as a respective "line 132." Respective lines 132 may be parallel to, and not in line with, a respective further other line 132 defined by a respective clockwise-trailing edge 130 of the respective fin 104 opposite, relative to the center axis 106, the fin 104. As a non-limiting example, clockwise-trailing edge 130a of fin 104a may define line 132a. Line 132a may be parallel to, and not in line with, line 132c, which line 132c may be defined by clockwise-trailing edge 130c of fin 104c, which fin 104c may be opposite fin 104c.

Respective pairs of clockwise-leading edges 126 and clockwise-trailing edges 130 may be substantially straight. Thus, the number of fins 104 may include two respective substantially-straight lateral edges (a respective clockwise-leading edge 126 and a respective clockwise-trailing edge 130) between the respective inner-circumferential edge 116 and the respective outer-circumferential edge 108 (FIG. 1A).

Figure 2A:
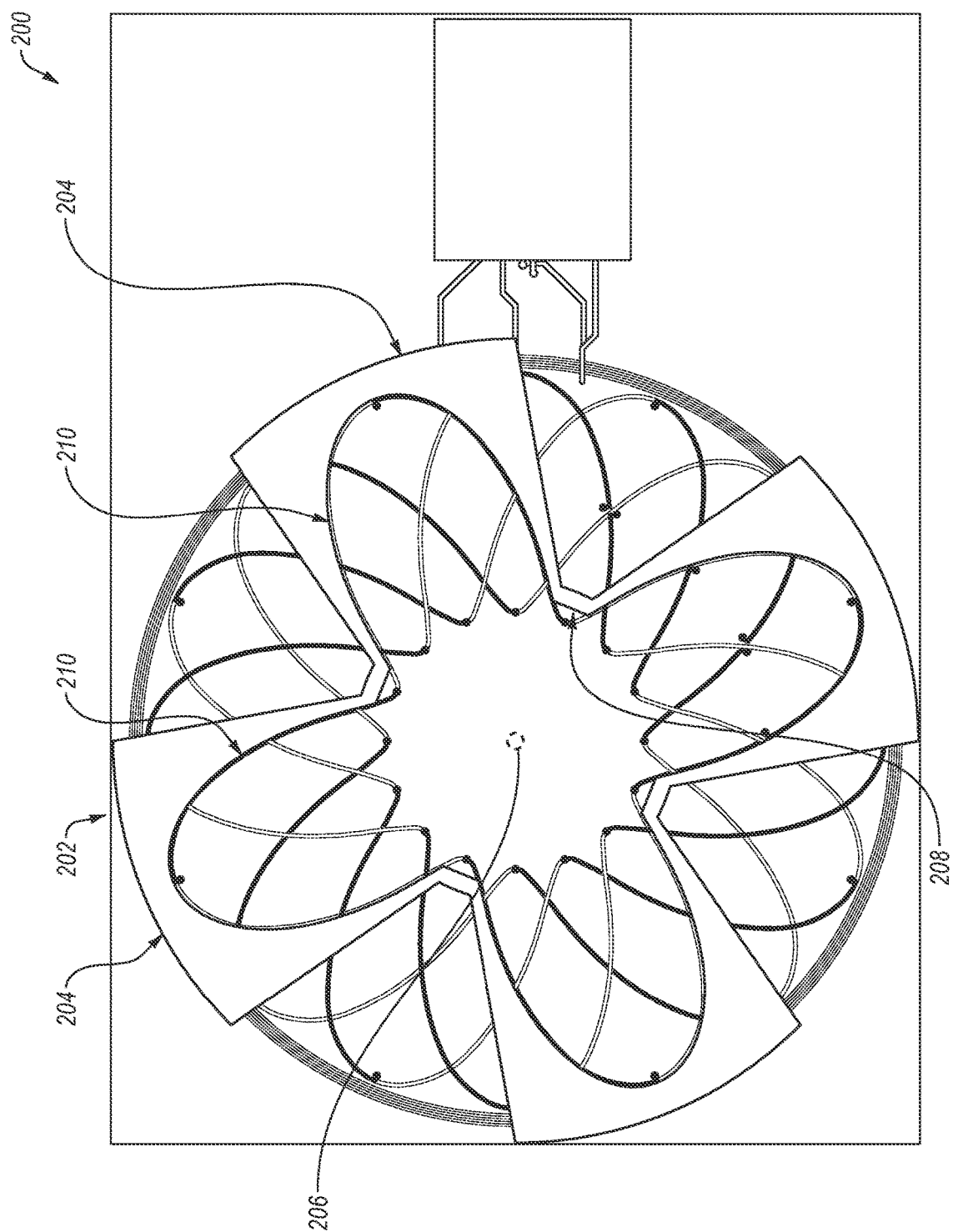
FIG. 2A is a functional block diagram illustrating an apparatus according to one or more examples.

FIG. 2A is a functional block diagram illustrating an apparatus 200 according to one or more examples. Apparatus 200 may be, or may include, an inductive angular-position sensor. Apparatus 200 may include a target 202, which target 202 may disrupt magnetic coupling between sense coils and an oscillator coil of the inductive angular-position sensor. Target 202 may be formed of metal.

Target 202 may rotate around a center axis 206. Target 202 may include a number of fins 204, which fins 204 may be evenly radially spaced around center axis 206. Target 202 may include an inner perimeter 208, which inner perimeter 208 may define a respective rounded cutout 210 in respective ones of the fins 204.

Target 202 may be similar to target 102 of FIG. 1A, FIG. 1A, FIG. 1B, and FIG. 1C, except that target 202 includes rounded cutouts 210. Stated another way, respective ones of fins 204 define a respective rounded cutout 210.

Target 202 may be less expensive than other targets because target 202 may include less material than other targets of the other sensors. Yet, target 202 may still allow sense coils to produce sense signals having similar amplitudes to the other sensors including the other targets. Additionally or alternatively, target 202 may allow sense coils to produce sense signals having amplitudes that are within an operational threshold of a sensor.

Target 202 may weigh less than other targets. The weight of target 202, being less than other targets, may save energy in systems that use target 202 compared to the other targets e.g., because a rotor coupled to target 202 will have less rotational inertia than a rotor coupled to other targets.

Figure 2B:
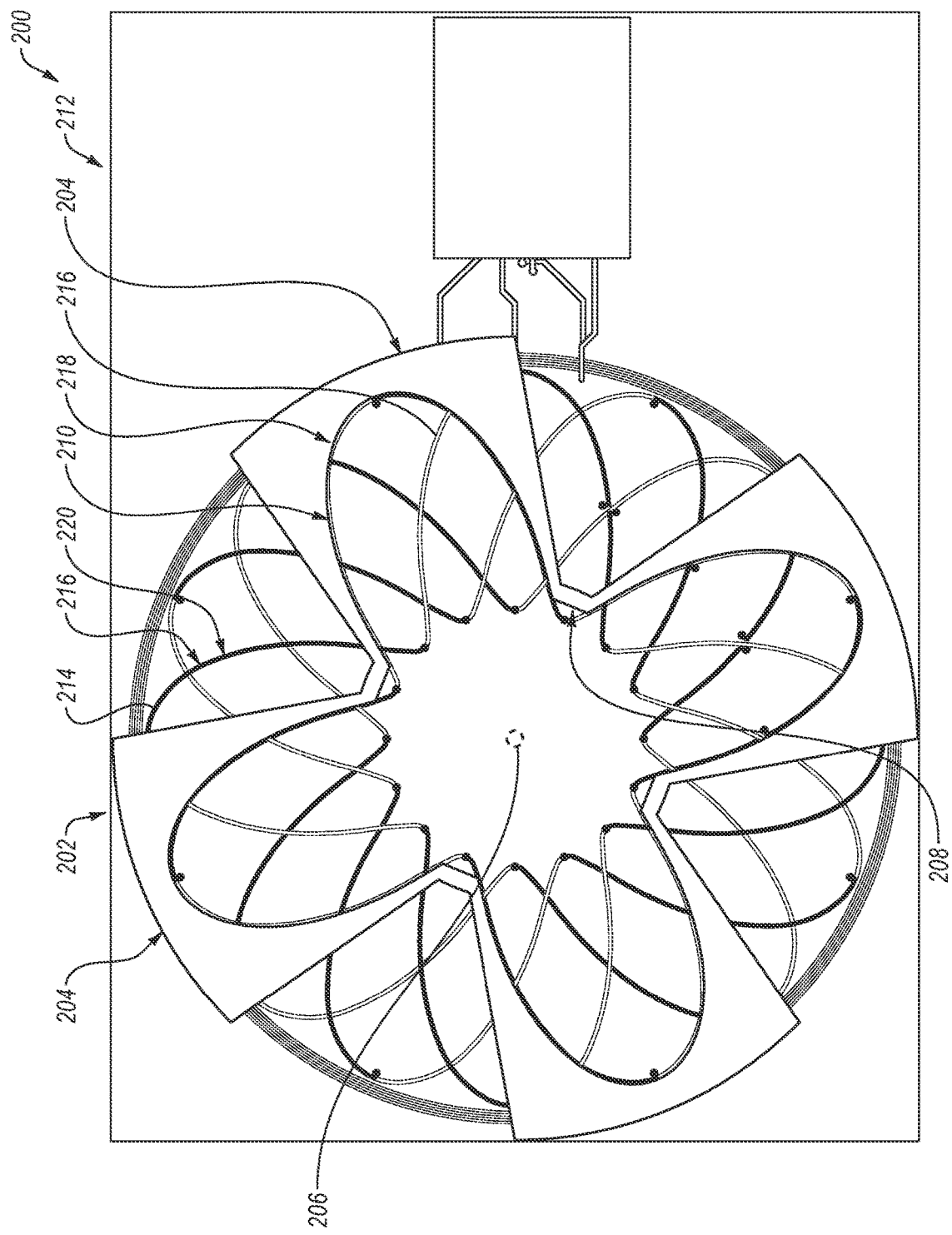
FIG. 2B is a functional block diagram illustrating the apparatus of FIG. 2A according to one or more examples.

FIG. 2B is a functional block diagram illustrating apparatus 200 according to one or more examples.

Apparatus 200 may be, or may include, an angular-position sensor 212. Angular-position sensor 212 may include a sense coil 214 including a number of lobes 216 arranged around center axis 206. Angular-position sensor 212 may include target 202 arranged to rotate about center axis 206. Target 202 may include a number of fins 204. Target 202 may include an inner perimeter 208 defining a respective rounded cutout 210 in respective fins 204. The respective rounded cutouts 210 may be substantially similar in shape to a lobe 216 of the number of lobes 216. As a non-limiting example, a shape 218 of a fin 204 may be substantially similar to a shape 220 of a lobe 216 of sense coil 214.

In the present disclosure, references to two objects having a "similar" shape may refer to a similarity between an outline, or profile, of the objects. Similar shapes may or may not be identical Similar shapes may or may not have the same size. If an outline of a first shape can be sized and arranged to substantially overlie an outline of a second shape, the shapes may be described as having a similar shape.

Figure 2C:
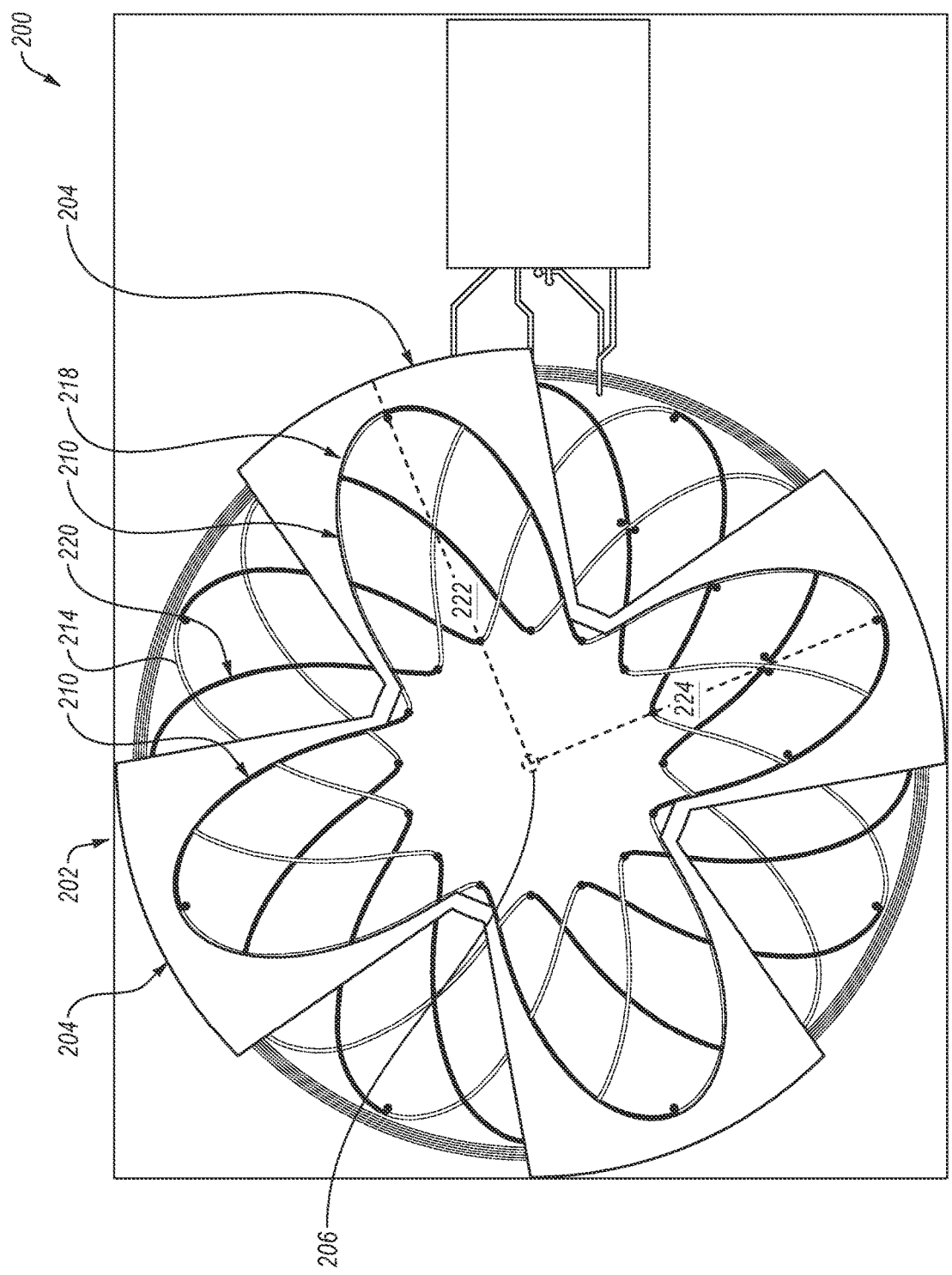
FIG. 2C is a functional block diagram illustrating the apparatus of FIG. 2A according to one or more examples.

FIG. 2C is a functional block diagram illustrating apparatus 200 according to one or more examples. The respective rounded cutout 210 in respective ones of the number of fins 204 may have a respective first radial length 224 that is greater than half a respective second radial length 222 of the respective fin 204.

Figure 3:
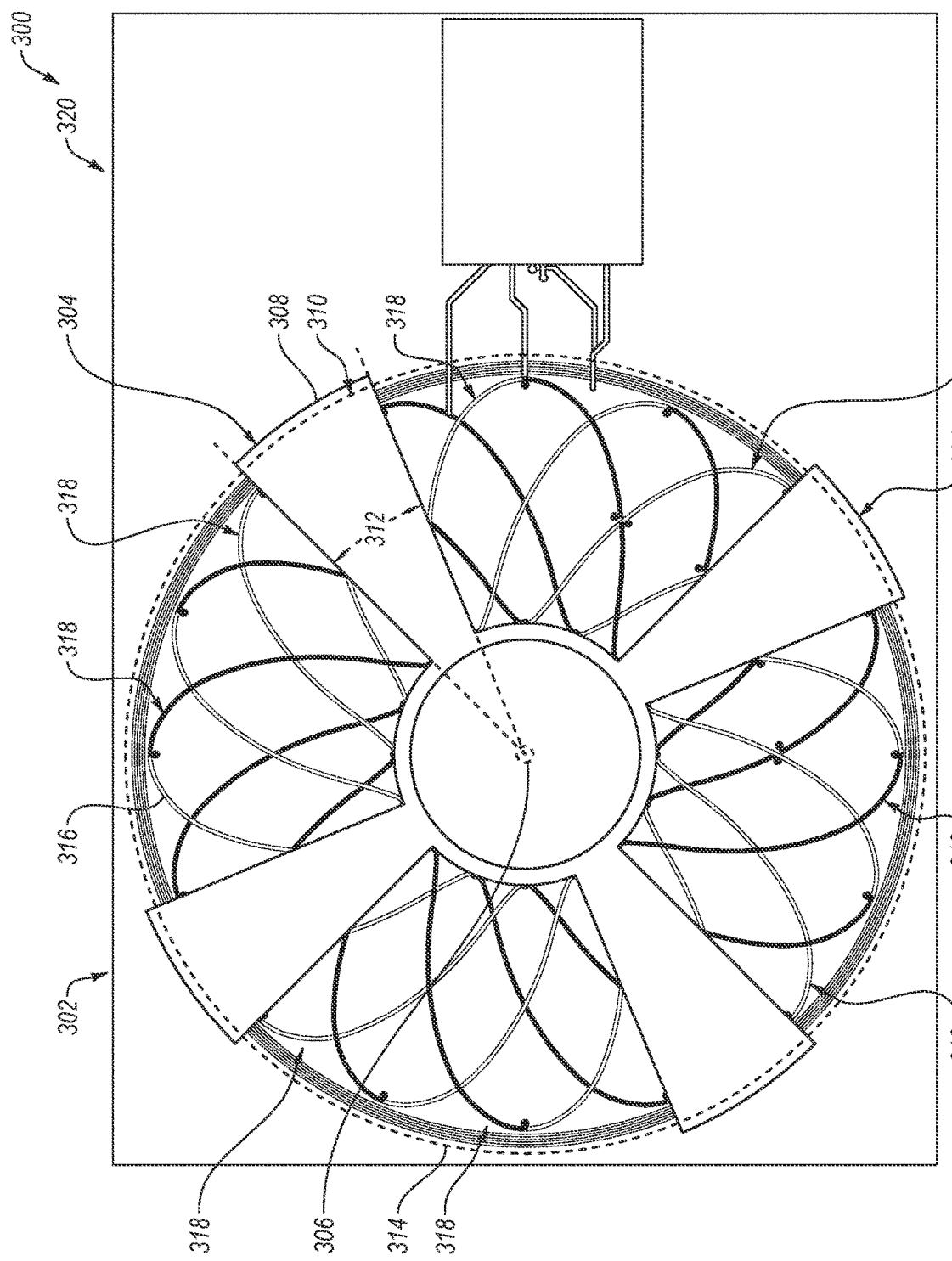
FIG. 3 is a functional block diagram illustrating an apparatus according to one or more examples.

FIG. 3 is a functional block diagram illustrating an apparatus 300 according to one or more examples. Apparatus 300 may be, or may include, an inductive angular-position sensor 320. Apparatus 300 may include a target 302, which target 302 may disrupt magnetic coupling between sense coils 316 and an oscillator coil of inductive angular-position sensor 320. Target 302 may be formed of metal.

Inductive angular-position sensor 320 may include sense coil 316, which sense coil 316 may include a number of radially-symmetric lobes 318 evenly arranged around a center axis 306. Inductive angular-position sensor 320 may include target 302 including a number of fins 304 evenly radially spaced around center axis 306. A count of the number of radially-symmetric lobes 318 may be twice a count of the number of fins 304. Respective ones of the number of fins 304 may have a respective outer edge 308 that may overlap a respective arc 310 at least partially defining a circle 314 centered at center axis 306. A respective central angle 312 of the respective arc 310 may be substantially equal to 360° divided by twice the count of the number of radially-symmetric lobes 318. The respective central angle 312 may have a respective apex at center axis 306.

Fins 304 of target 302 may be collectively above, or under, a fraction of sense coil 316, the fraction substantially equal to one divided by the count of the number of fins 304.

Target 302, as illustrated in FIG. 3 includes four fins 304 as an example. According to the example of target 302, a count of the number of radially-symmetric lobes 318 may include eight radially-symmetric lobes 318, a count of the number of fins 304 may include four fins, and the central angles 312 of the respective arcs 310 may be 22.5°. In another non-limiting example, a count of the number of radially-symmetric lobes may include six radially-symmetric lobes, a count of the number of fins may include three fins, and the central angles of the respective arcs may be 30°. In another non-limiting example, a count of the number of radially-symmetric lobes may include twelve radially-symmetric lobes, a count of the number of fins may include six fins, and the central angles of the respective arcs may be 15°. The examples of numbers of fins, lobes, and central angles are given as non-limiting examples.

Cost of materials and to manufacture target 302 may be less expensive than other targets because target 302 may include less material than other targets that provide similar sensitivity. Target 302 allows sense coils to produce sense signals having similar amplitudes to those produced by sense coils of other sensors including the other targets, but at lower cost. Additionally or alternatively, target 302 may allow sense coils to produce sense signals having amplitudes that are within an operational threshold of a sensor.

Further, target 302 may weigh less than other targets. The weight of target 302, being less than other targets, may save energy in systems that use target 302 compared to the other targets e.g., because a rotor coupled to target 302 will have less rotational inertia than a rotor coupled to other targets, without limitation.

Additionally or alternatively, inductive angular-position sensor 320, including target 302, may use less energy than other inductive angular-position sensors because target 302 may cause less loading on the oscillator coil, which may lead to lower current consumption compared with other inductive angular-position sensors including other targets. As such target 302 may be particularly advantageous in inductive angular-position sensor 320 for low-current or low airgap applications.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

As used in the present disclosure, the terms "module" or "component" may refer to specific hardware implementations may perform the actions of the module or component or software objects or software routines that may be stored on or executed by general purpose hardware (e.g., computer-readable media, processing devices, without limitation) of the computing system. In one or more examples, the different components, modules, engines, and services described in the present disclosure may be implemented as objects or processes that execute on the computing system (e.g., as separate threads, without limitation). While some of the system and methods described in the present disclosure are generally described as being implemented in software (stored on or executed by general purpose hardware), specific hardware implementations or a combination of software and specific hardware implementations are also possible and contemplated.

As used in the present disclosure, the term "combination" with reference to a plurality of elements may include a combination of all the elements or any of various different sub-combinations of some of the elements. For example, the phrase "A, B, C, D, or combinations thereof" may refer to any one of A, B, C, or D; the combination of each of A, B, C, and D; and any sub-combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," without limitation). As used herein, "each" means "some or a totality." As used herein, "each and every" means "a totality."

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" or "an" means "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, without limitation" or "one or more of A, B, and C, without limitation." is used, in general such a construction is intended to include A alone, B alone, C alone, A and B together, A and C together, B and C together, or A, B, and C together, without limitation.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples of the disclosure may include:

Example 1: An apparatus comprising: a target for an inductive angular-position sensor, the target to rotate about a center axis, the target comprising a number of fins, the number of fins respectively comprising: a respective outer-circumferential edge to overlap a respective first arc at least partially defining a first circle centered at the center axis, a respective first central angle of the respective first arc substantially equal to 360° divided by twice a count of the number of fins, the respective first central angle having a respective first apex at the center axis; and a respective inner-circumferential edge, the respective inner-circumferential edge positioned closer to the center axis than the respective outer-circumferential edge is to the center axis, the respective inner-circumferential edge to overlap a respective second arc at least partially defining a second circle centered at the center axis, a respective second central angle of the respective second arc substantially equal to 360° divided by the count of the number of fins, the respective second central angle having a respective second apex at the center axis.

Example 2: The apparatus according to Example 1, wherein the number of fins respectively comprise two respective substantially-straight lateral edges between the respective inner-circumferential edge and the respective outer-circumferential edge.

Example 3: The apparatus according to Examples 1 and 2, wherein the two substantially straight lateral edges comprise a respective clockwise-leading edge and a respective clockwise-trailing edge, the respective clockwise-leading edge defining a respective line that is parallel to, and not in line with, a further respective line defined by a respective clockwise-leading edge of a respective fin opposite, relative to the center axis, the fin.

Example 4: The apparatus according to Examples 1 to 3, wherein the respective clockwise-trailing edge defines a respective other line that is parallel to, and not in line with, a respective further other line defined by a respective clockwise-trailing edge of the respective fin opposite, relative to the center axis, the fin.

Example 5: The apparatus according to Examples 1 to 4, wherein the number of fins respectively define a respective rounded cutout.

Example 6: The apparatus according to Examples 1 to 5, wherein the respective rounded cutout is similar in shape to a lobe of a number of lobes of a sense coil of the inductive angular-position sensor.

Example 7: An apparatus comprising: a target for an inductive angular-position sensor, the target to rotate about a center axis, the target comprising a number of fins evenly radially spaced around the center axis, the number of fins respectively comprising: a respective clockwise-leading edge, the respective clockwise-leading edge defining a respective line that is parallel to, and not in line with, a respective further line defined by a respective clockwise-leading edge of a respective fin opposite, relative to the center axis, the fin.

Example 8: The apparatus according to Example 7, wherein the number of fins respectively comprise a respective clockwise-trailing edge, the respective clockwise-trailing edge defining a respective other line that is parallel to, and not in line with, a respective further other line defined by a respective clockwise-trailing edge of the respective fin opposite, relative to the center axis, the fin.

Example 9: The apparatus according to Examples 7 and 8, wherein respective outer-circumferential edges of the number of fins overlap respective arcs, the respective arcs at least partially defining a circle centered at the center axis, a respective central angle of the respective arcs substantially equal to 360° divided by twice a count of the number of fins.

Example 10: The apparatus according to Examples 7 to 9, wherein respective inner-circumferential edges of the number of fins overlap respective second arcs, the respective second arcs at least partially defining a second circle centered at the center axis, a respective second central angle of the respective second arc substantially equal to 360° divided by the count of the number of fins, the respective second central angle having a respective second apex at the center axis.

Example 11: The apparatus according to Examples 7 to 10, wherein the number of fins respectively define a respective rounded cutout.

Example 12: The apparatus according to Examples 7 to 11, wherein the respective rounded cutout has a respective first radial length greater than half a respective second radial length of the respective fin.

Example 13: The apparatus according to Examples 7 to 12, wherein the respective rounded cutout is similar in shape to a lobe of a number of lobes of a sense coil of the inductive angular-position sensor.

Example 14: An apparatus comprising: a target for an inductive angular-position sensor, the target to rotate about a center axis, the target comprising a number of fins evenly radially spaced around the center axis, the target comprising: an inner perimeter defining a respective rounded cutout in respective ones of the number of fins.

Example 15: The apparatus according to Example 14, wherein the respective rounded cutout has a respective first radial length that is greater than half a respective second radial length of the respective fin.

Example 16: The apparatus according to Examples 14 and 15, wherein the respective rounded cutout is similar in shape to a lobe of a number of lobes of a sense coil of the inductive angular-position sensor.

Example 17: An apparatus, comprising: an angular-position sensor comprising: a sense coil comprising a number of lobes arranged around a center axis; and a target arranged to rotate about a center axis, the target comprising a number of fins, an inner perimeter of the target defining respective rounded cutouts of the number of fins substantially similar in shape to a lobe of the number of lobes.

Example 18: The apparatus according to Example 17, wherein the respective rounded cutout has a respective first radial length that is greater than half a respective second radial length of the respective fin.

Example 19: An apparatus comprising: an angular-position sensor comprising: a sense coil comprising a number of radially-symmetric lobes evenly arranged around a center axis; and a target comprising a number of fins evenly radially spaced around the center axis, a count of the number of radially-symmetric lobes being twice a count of the number of fins, respective ones of the number of fins having a respective outer edge to overlap a respective arc at least partially defining a circle centered at the center axis, a respective central angle of the respective arc substantially equal to 360° divided by twice the count of the number of radially-symmetric lobes, the respective central angle having a respective apex at the center axis.

Example 20: The apparatus according to Example 19, wherein the fins of the target are collectively above, or under, a fraction of the sense coil, the fraction substantially equal to one divided by the count of the number of fins.

While the present disclosure has been with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another non-limiting example while still being encompassed within the scope of the invention as contemplated by the inventor.

What is claimed is:

1. An apparatus comprising:
a target for an inductive angular-position sensor, the target to rotate about a center axis, the target comprising a number of fins, the number of fins respectively comprising:
a respective outer-circumferential edge to overlap a respective first arc at least partially defining a first circle centered at the center axis, a respective first central angle of the respective first arc substantially equal to 360° divided by twice a count of the number of fins, the respective first central angle having a respective first apex at the center axis; and
a respective inner-circumferential edge, the respective inner-circumferential edge positioned closer to the center axis than the respective outer-circumferential edge is to the center axis, the respective inner-circumferential edge to overlap a respective second arc at least partially defining a second circle centered at the center axis, a respective second central angle of the respective second arc substantially equal to 360° divided by the count of the number of fins, the respective second central angle having a respective second apex at the center axis.

2. The apparatus of claim 1, wherein the number of fins respectively comprise two respective substantially-straight lateral edges between the respective inner-circumferential edge and the respective outer-circumferential edge.

3. The apparatus of claim 2, wherein the two substantially straight lateral edges comprise a respective clockwise-leading edge and a respective clockwise-trailing edge, the respective clockwise-leading edge defining a respective line that is parallel to, and not in line with, a further respective line defined by a respective clockwise-leading edge of a respective fin opposite, relative to the center axis, the fin.

4. The apparatus of claim 3, wherein the respective clockwise-trailing edge defines a respective other line that is parallel to, and not in line with, a respective further other line defined by a respective clockwise-trailing edge of the respective fin opposite, relative to the center axis, the fin.

5. The apparatus of claim 1, wherein the number of fins respectively define a respective rounded cutout.

6. The apparatus of claim 5, wherein the respective rounded cutout is similar in shape to a lobe of a number of lobes of a sense coil of the inductive angular-position sensor.

7. An apparatus comprising:
a target for an inductive angular-position sensor, the target to rotate about a center axis, the target comprising a number of fins evenly radially spaced around the center axis, the number of fins respectively comprising:
a respective clockwise-leading edge, the respective clockwise-leading edge defining a respective line that is parallel to, and not in line with, a respective further line defined by a respective clockwise-leading edge of a respective fin opposite, relative to the center axis, the fin.

8. The apparatus of claim 7, wherein the number of fins respectively comprise a respective clockwise-trailing edge, the respective clockwise-trailing edge defining a respective other line that is parallel to, and not in line with, a respective further other line defined by a respective clockwise-trailing edge of the respective fin opposite, relative to the center axis, the fin.

9. The apparatus of claim 7, wherein respective outer-circumferential edges of the number of fins overlap respective arcs, the respective arcs at least partially defining a circle centered at the center axis, a respective central angle of the respective arcs substantially equal to 360° divided by twice a count of the number of fins.

10. The apparatus of claim 9, wherein respective inner-circumferential edges of the number of fins overlap respective second arcs, the respective second arcs at least partially defining a second circle centered at the center axis, a respective second central angle of the respective second arc substantially equal to 360° divided by the count of the number of fins, the respective second central angle having a respective second apex at the center axis.

11. The apparatus of claim 7, wherein the number of fins respectively define a respective rounded cutout.

12. The apparatus of claim 11, wherein the respective rounded cutout has a respective first radial length greater than half a respective second radial length of the respective fin.

13. The apparatus of claim 11, wherein the respective rounded cutout is similar in shape to a lobe of a number of lobes of a sense coil of the inductive angular-position sensor.

14. An apparatus comprising:
a target for an inductive angular-position sensor, the target to rotate about a center axis, the target comprising a number of fins evenly radially spaced around the center axis, the target comprising:
an inner perimeter defining a respective rounded cutout in respective ones of the number of fins.

15. The apparatus of claim 14, wherein the respective rounded cutout has a respective first radial length that is greater than half a respective second radial length of the respective fin.

16. The apparatus of claim 14, wherein the respective rounded cutout is similar in shape to a lobe of a number of lobes of a sense coil of the inductive angular-position sensor.

17. An apparatus, comprising:
an angular-position sensor comprising:
a sense coil comprising a number of lobes arranged around a center axis; and
a target arranged to rotate about a center axis, the target comprising a number of fins, an inner perimeter of the target defining respective rounded cutouts of the number of fins substantially similar in shape to a lobe of the number of lobes.

18. The apparatus of claim 17, wherein the respective rounded cutout has a respective first radial length that is greater than half a respective second radial length of the respective fin.

19. An apparatus comprising:
an angular-position sensor comprising:
a sense coil comprising a number of radially-symmetric lobes evenly arranged around a center axis; and
a target comprising a number of fins evenly radially spaced around the center axis, a count of the number of radially-symmetric lobes being twice a count of the number of fins, respective ones of the number of fins having a respective outer edge to overlap a respective arc at least partially defining a circle centered at the center axis, a respective central angle of the respective arc substantially equal to 360° divided by twice the count of the number of radially-symmetric lobes, the respective central angle having a respective apex at the center axis.

20. The apparatus of claim 19, wherein the fins of the target are collectively above, or under, a fraction of the sense coil, the fraction substantially equal to one divided by the count of the number of fins.

* * * * *

UNITED STATES PATENT AND TRADEMARK OFFICE
CERTIFICATE OF CORRECTION

Page 1 of 1

PATENT NO. : 12,203,780 B2
APPLICATION NO. : 18/048627
DATED : January 21, 2025
INVENTOR(S) : Ganesh Shaga It is certified that error appears in the above-identified patent and that said Letters Patent is hereby corrected as shown below:

In the Specification

Column 1, Line 38, change "BRIEF DESCRIPTION THE DRAWINGS" to --BRIEF DESCRIPTION OF THE DRAWINGS--

Column 9, Line 34, change "not be identical Similar shapes" to --not be identical. Similar shapes--

Signed and Sealed this
Eighth Day of April, 2025

Coke Morgan Stewart
*Acting Director of the United States Patent and Trademark Office*